US012709003B2

(12) United States Patent
Rezaei-Shoshtari et al.

(10) Patent No.: US 12,709,003 B2
(45) Date of Patent: Aug. 18, 2026

(54) UNIVERSAL APPROXIMATION OF REINFORCEMENT LEARNING SOLUTIONS WITH HYPERNETWORKS

(71) Applicant: SAMSUNG ELECTRONICS CO., LTD., Suwon-si (KR)

(72) Inventors: Sahand Rezaei-Shoshtari, Montreal (CA); David Meger, Montreal (CA); Francois Robert Hogan, St-Jean-sur-Richelieu (CA); Gregory Lewis Dudek, Westmount (CA); Charlotte Morissette, Montreal (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 484 days.

(21) Appl. No.: 18/385,696

(22) Filed: Oct. 31, 2023

(65) Prior Publication Data

US 2024/0198517 A1 Jun. 20, 2024

Related U.S. Application Data

(60) Provisional application No. 63/434,034, filed on Dec. 20, 2022.

(51) Int. Cl.
*B25J 9/16* (2006.01)
*B25J 13/00* (2006.01)

(52) U.S. Cl.
CPC ............... *B25J 9/163* (2013.01); *B25J 9/161* (2013.01); *B25J 9/1664* (2013.01); *B25J 13/003* (2013.01)

(58) Field of Classification Search
CPC . B25J 9/163; B25J 9/161; B25J 9/1664; B25J 13/003
USPC .......................................................... 706/39
See application file for complete search history.

(56) References Cited

U.S. PATENT DOCUMENTS

| | | | | |
|---|---|---|---|---|
| 12,210,943 | B2 * | 1/2025 | Li | G06N 3/008 |
| 12,576,515 | B2 * | 3/2026 | Zolna | B25J 9/161 |
| 2018/0250825 | A1 * | 9/2018 | Hashimoto | A61B 34/37 |
| 2020/0254609 | A1 | 8/2020 | Claussen et al. | |
| 2021/0205988 | A1 * | 7/2021 | James | G06N 3/0985 |
| 2021/0237266 | A1 * | 8/2021 | Kalashnikov | B25J 9/163 |
| 2021/0387330 | A1 * | 12/2021 | Mavrin | G06N 3/092 |
| 2022/0040852 | A1 * | 2/2022 | Abdou | B25J 9/163 |
| 2022/0105624 | A1 * | 4/2022 | Kalakrishnan | B25J 9/163 |
| 2022/0134537 | A1 * | 5/2022 | Chadalavada Vijay Kumar | B25J 9/163 700/250 |
| 2022/0193914 | A1 * | 6/2022 | Liu | B25J 9/1612 |
| 2023/0035150 | A1 * | 2/2023 | Yang | B25J 9/1612 |
| 2023/0241770 | A1 * | 8/2023 | Itou | B25J 9/1666 700/246 |

(Continued)

OTHER PUBLICATIONS

Faccio et al., "Goal-Conditioned Generators of Deep Policies," arXiv:2207.01570v1 [cs.LG], Jul. 2022, Total 16 pages.

*Primary Examiner* — Tung T Vo
(74) *Attorney, Agent, or Firm* — Sughrue Mion, PLLC

(57) ABSTRACT

Provided is a method for training a hypernetwork to provide a policy for use on a previously-unseen task. The hypernetwork may be trained at a robot factory and then shipped with a robot. At the point of deployment, the robot may be given a context for the previously-unseen task. The robot then uses the context and the hypernetwork to create a policy for performing the previously-unseen task. The policy represents an artificial intelligence machine generated for the previously-unseen task.

20 Claims, 10 Drawing Sheets

(56) References Cited

U.S. PATENT DOCUMENTS

| | | | | |
|---|---|---|---|---|
| 2023/0271318 | A1* | 8/2023 | Gao | B25J 9/1605<br>700/245 |
| 2023/0294292 | A1* | 9/2023 | Ono | B25J 9/1676<br>700/259 |
| 2024/0118667 | A1* | 4/2024 | Rao | B25J 9/163 |
| 2024/0289614 | A1* | 8/2024 | Birru | G06N 3/045 |
| 2025/0131280 | A1* | 4/2025 | Kristiansen | G06N 7/01 |
| 2025/0200388 | A1* | 6/2025 | Birru | G06N 3/045 |
| 2025/0272576 | A1* | 8/2025 | Zela | G06N 3/0985 |
| 2026/0030509 | A1* | 1/2026 | Garrett | B25J 9/163 |

* cited by examiner

Hypernetwork as an approximation of the RL Algorithm

Cheetah environment,
Zero-shot transfer to new dynamics settings

UNIVERSAL APPROXIMATION OF REINFORCEMENT LEARNING SOLUTIONS WITH HYPERNETWORKS

CROSS REFERENCE TO RELATED APPLICATION(S)

This application claims benefit of priority to U.S. Provisional Application No. 63/434,034 filed in the USPTO on Dec. 20, 2022. The content of the above application is hereby incorporated by reference.

FIELD

This application is related to obtaining parameters of a target neural network.

BACKGROUND

Humans possess an ability to adapt their behavior to new situations. Beyond simple tuning, humans can adopt entirely novel ways of moving their bodies, for example walking on crutches, with little to no training after an injury. The learning process that generalizes across all past experience and modes of behavior to rapidly output the needed behavior policy for a new situation is a hallmark of human intelligence.

A neural network model pertaining to a Markov decision process (MDP) may include a policy for determining each articulation of joints in a robot arm several times per second. The policy may be a part of an artificial intelligence machine called an agent in the robot.

A problem in the realm of robots is that a policy, possibly trained with near-optimal reinforcement learning (RL), will not perform well on a related, but different task. The robot may be shipped from a robot factory to a place of deployment (a home or a factory) including the policy installed at the robot factory.

For example, a robot trained to pick up a hammer may not pick up a coffee cup using the hammer policy.

The coffee cup example can be accommodated by storing a separate coffee cup policy in the robot. This approach requires exhaustively anticipating the possible tasks.

However, storing one policy for each possible task is an approach limited to the known tasks before the robot is deployed. The robot will not be able to do a new task. Also, the memory required in the robot will scale to excessively increase with the number of the exhaustively-anticipated tasks.

SUMMARY

Embodiments of the present disclosure may solve the above technical problems.

This application provides a strong zero-shot behavior generalization approach based on hypernetworks. Hypernetworks allow a deep hyper-learner to output all parameters of a target neural network.

Embodiments provided herein train on the full solutions of numerous RL problems in a family of MDPs, where either reward or dynamics (often both) can change between task instances. The trained policies, value functions and rolled-out optimal behavior of each source task is the training information from which embodiments learn to generalize.

Hypernetworks of embodiments output the parameters of a fully-formed and highly performing policy without any experience in a related but unseen task, by conditioning on provided task parameters.

The differences between the tasks leads to large and complicated changes in the optimal policy and induced optimal trajectory distribution. Learning to predict new policies from this data requires powerful learners guided by helpful loss functions. Embodiments show that the abstraction and modularity properties afforded by hypernetworks allow them to approximate RL generated solutions by mapping a parametrized MDP family to a set of optimal solutions.

Embodiments achieve strong zero-shot transfer to new rewards and dynamics settings by exploiting commonalities in the MDP structure.

Embodiments are applicable across families of continuous control environments which are parameterized by physical dynamics, task reward, or both.

Embodiments include contextual zero-shot evaluation, where the learner is provided the parameters of the test task, but is not given any training time—rather the very first policy execution at test time is used to measure performance.

Embodiments outperform selected well-known baselines, in many cases recovering nearly full performance without a single time step of training data on the target tasks.

Ablations show that hypernetworks are a critical element in achieving strong generalization and that a structured TD-like loss, see Equation 5, is additionally helpful in training these networks.

Embodiments disclose hypernetworks which are a scalable and practical approach for approximating RL algorithms as a mapping from a family of parameterized MDPs to a family of near optimal policies.

Some embodiments include a TD-based loss for regularization of the generated policies and value functions to be consistent with respect to the Bellman equation.

Embodiments are applicable to a series of modular and customizable continuous control environments for transfer learning.

Provided herein is a method of training a hypernetwork, the method including: initializing the hypernetwork; sampling a mini-batch of system parameter sets from a plurality of system parameter sets; generating, using the hypernetwork, policy weights for a policy; generating, using the hypernetwork, value function weights for a value function; calculating a first loss, L_pred, using the mini-batch; calculating a second loss, L_TD, using the mini-batch; updating the hypernetwork using the first loss and the second loss; and repeating the sampling through the updating until the hypernetwork has converged.

Also provided herein is an apparatus including: one or more processors; and one or more memories, the one or more memories storing instructions configured to cause the apparatus to at least: initialize a hypernetwork; sample a mini-batch of system parameter sets from a plurality of system parameter sets; generate, using the hypernetwork, policy weights for a policy; generate, using the hypernetwork, value function weights for a value function; calculate a first loss, L_pred, using the mini-batch; calculate a second loss, L_TD, using the mini-batch; update the hypernetwork using the first loss and the second loss; and repeatedly perform the sample through update operations until the hypernetwork has converged.

Also provided herein is a non-transitory computer readable medium storing instructions, the instructions configured to cause an apparatus to at least: initialize a hypernetwork; sample a mini-batch of system parameter sets from a plurality of system parameter sets; generate, using the hypernetwork, policy weights for a policy; generate, using the hypernetwork, value function weights for a value function;

calculate a first loss, L_pred, using the mini-batch; calculate a second loss, L_TD, using the mini-batch; update the hypernetwork using the first loss and the second loss; and repeatedly perform the sample through update operations until the hypernetwork has converged.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Some frequently used terms are discussed here.

A hypernetwork is something which is able to synthesize a particular policy from a set of policies. The particular policy is a near-optimal solution for a particular robot arm activity.

Optimal trajectories may be obtained using software modeling or recording real-world data of proper (state, action, reward) points.

Once the Q-Values are known, the optimal policy is that which chooses the highest Q-Value for that state:

$$\pi^* = \underset{a}{\operatorname{argmax}} Q^*(s, a)$$

where Q*(s,a) is the sum of discounted future rewards the agent can expect on average after it reaches the state s and chooses the action a.

The TD learning algorithm is:

$$V_{k+1}(s) \leftarrow (1-\alpha)V_k(s) + \alpha(r + \gamma \cdot V_k(s'))$$

Trajectory: one experience of moving through the MDP.

Policy: an algorithm a software agent uses to determine its actions. The policy may be a neural network. The parameters of the policy are specific to the application of the robot arm.

Context: for the $i^{th}$ MDP $M_i \in M_{family}$ a context includes rewards $R_{\psi_i}$, trajectories $\tau_{\mu_i}$ and discount factor $\gamma$.

The Bellman optimality equation is:

$$V^*(s) = \max_a \sum_s T(s, a, s')[R(s, a, s') + \gamma V^*(s')]$$

for all s.

T(s,a,s') is the transition probability from state s to state s', given that the agent 20 chose action a. This may also be referred to as the dynamics function $T_\mu$, where $\mu$ represents the policy that is used to collect the coordinate points of the trajectory.

R(s,a,s') is the reward that the agent 20 receives when it goes from state s to state s' for the chosen action a. This may also be referred to as $R_{\psi_i}$, wherein $\psi$ represents parameters of R in piecewise fashion.

$\gamma$ is a discount factor.

Figure 1:
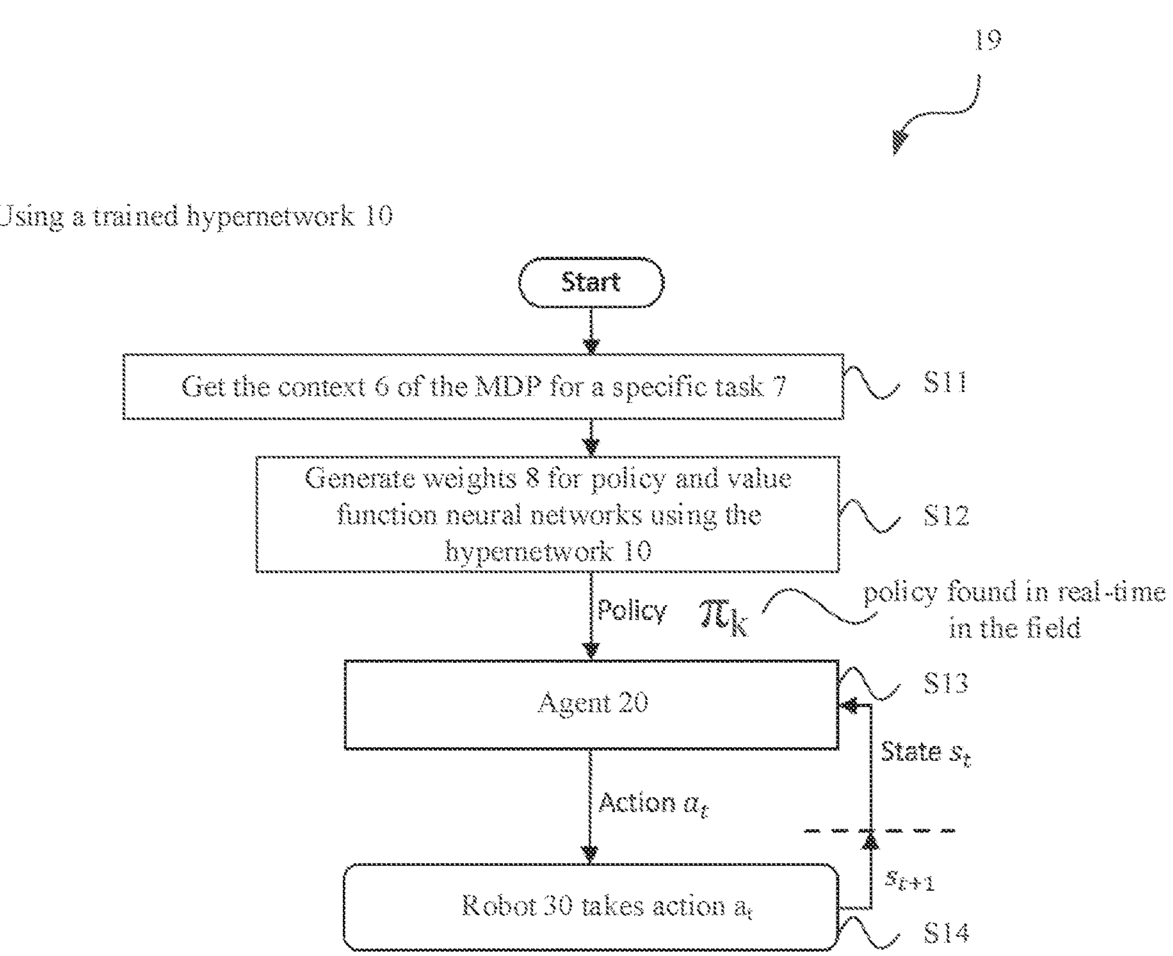
FIG. 1 illustrates logic for generating and using an artificial intelligence machine, an agent, for a robot, according to some embodiments.

FIG. 1 illustrates logic 19 for generating and using an artificial intelligence machine, the agent 20, for the robot 30, according to some embodiments.

At operation S11, the logic obtains the context 6 of the MDP for the specific task 7. At operation S12, the logic generates weights 8 for the policy and value function neural networks using the hypernetwork 10 ($H_\theta$). The policy $\pi_k$ is defined by the weights 8.

S13 indicates that the agent 20 queried at time t for an action to take. The action will be found using the policy $\pi_k$.

At operation S14, the robot 30, at time t, takes action $a_t$ using the policy $\pi_k$. The robot 30 has now moved to a new state ($S_{t+1}$). The logic returns to S13 to find the next action to take. The series of actions accomplish the task 7 corresponding to $\pi_k$. Task 7 corresponds to context 6. Thus, the robot takes a concrete action it previously was not configured to perform.

Figure 2:
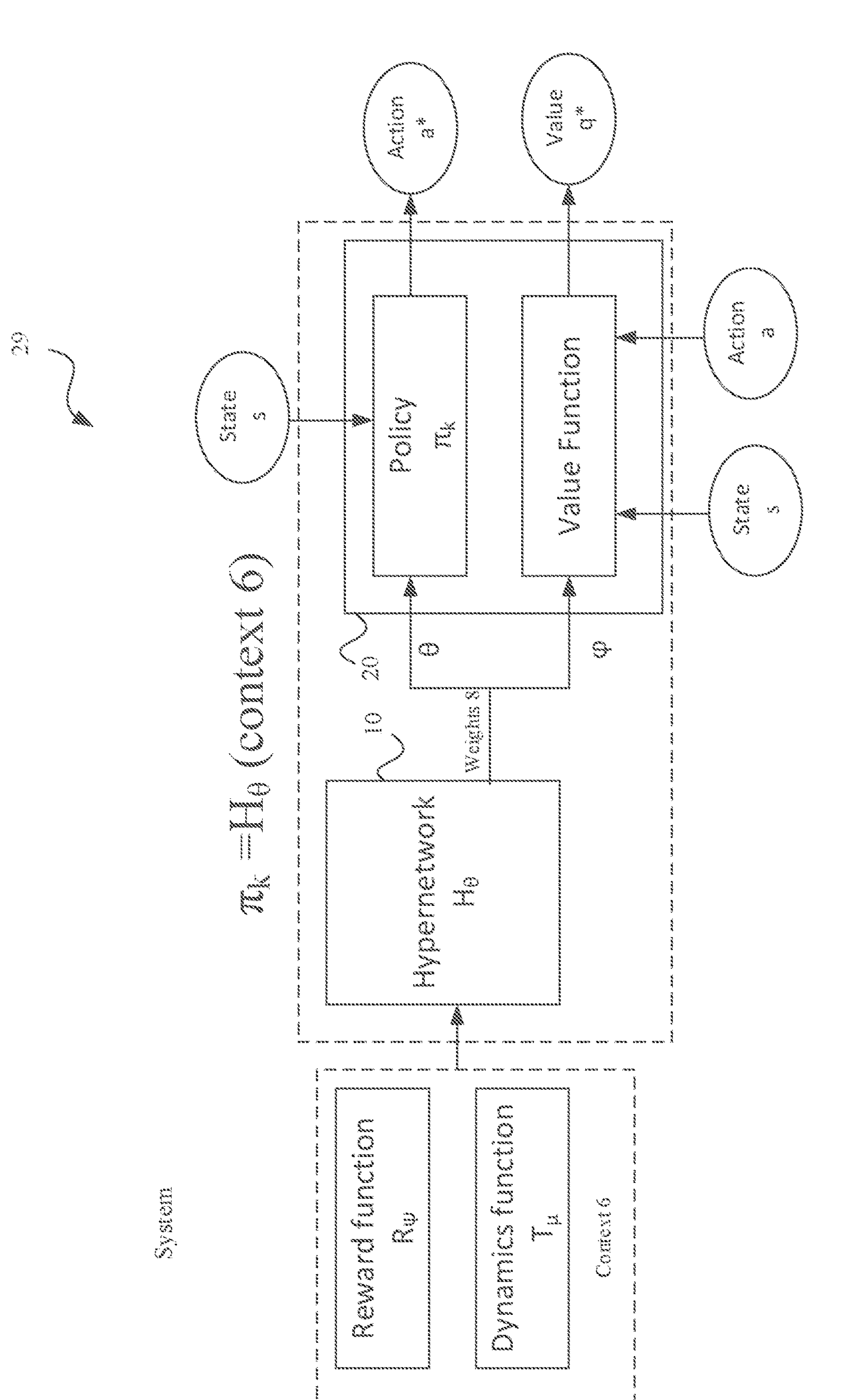
FIG. 2 is an overview of a system for a hypernetwork 10 generating an agent 20, according to some embodiments.

FIG. 2 is an overview of a system 29 for a hypernetwork 10 generating an agent 20. On the left portion of FIG. 2, the reward function and dynamics function represent a context 6. These are acted on by the hypernetwork 10 (also referred to as $H_\theta$) to produce weights 8 (indicated as $\theta_i$ and $\phi_i$) which represent, respectively, the policy $\pi_k$ and value function Q. The agent 20, which includes the policy $\pi_k$, tells the robot 30 to take action a to incrementally accumulate an ultimate highest reward. The value function tells the robot 30 the value q resulting from taking action a from state s.

Figure 3A:
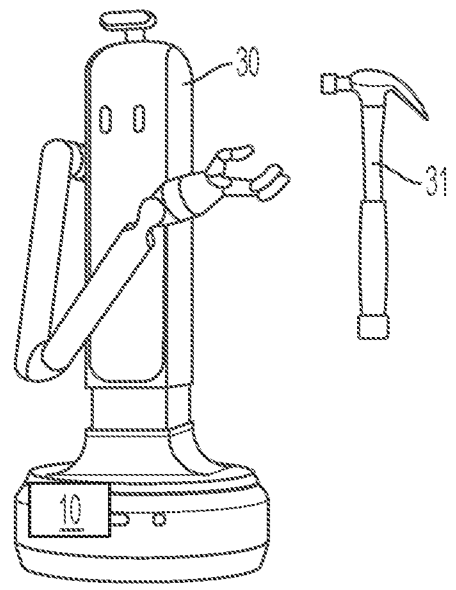
FIG. 3A illustrates a robot 30 which has been deployed with a hypernetwork 10, according to some embodiments.

FIG. 3A illustrates a robot 30 which has been deployed with a hypernetwork 10. The robot 30 is able to pick up a hammer 31 without obtaining a new policy. The robot 10 has been deployed with the hypernetwork 10 but does not have the agent 20 for picking up a coffee cup.

Figure 3B:
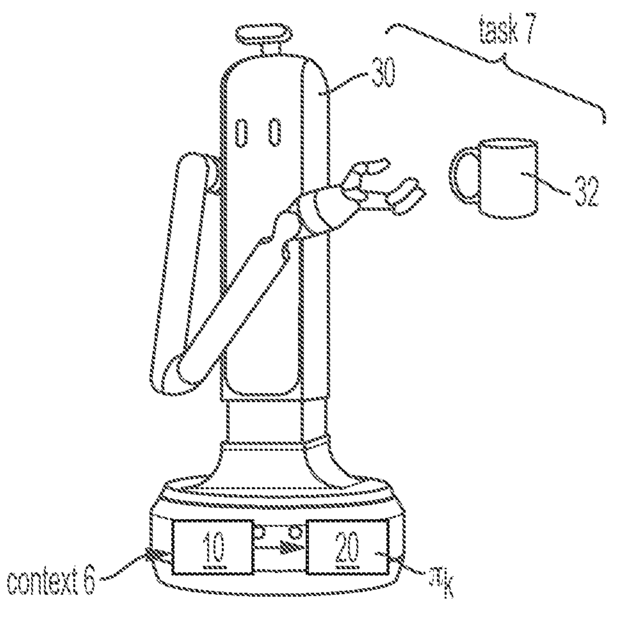
FIG. 3B illustrates the robot 30 of FIG. 3A provided with a context 6 from which it generates the agent 20 so that it may perform a new task 7, according to an example embodiment.

FIG. 3B illustrates the robot 30 of FIG. 3A provided with a context 6 from which it generates the agent 20 so that it may perform a new task 7. The task 7 is to pick up the coffee cup 32 without crushing the coffee cup and without spilling the coffee. The context 6 is provided to the hypernetwork 10 in the robot 30 and the agent 20 including the policy $\pi_k$ are created to perform the task 7 of picking up the coffee cup 32 with breaking the coffee cup and without spilling the coffee.

Referring generally to FIG. 3B, some embodiments include receiving a voice command from a user; mapping the voice command to a context; mapping the context to a hypernetwork input; obtaining the policy 20 ($\pi_k$) by inputting the hypernetwork input to the hypernetwork 10; and manipulating, using $\pi_k$ and in response to the voice command, an object with a robot arm.

Figure 4:
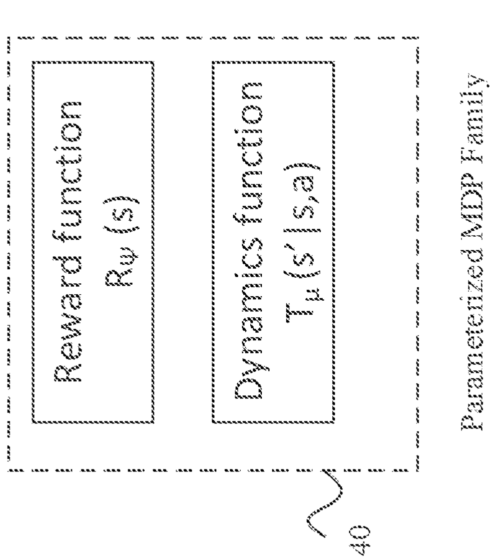
FIG. 4 compares a parameterized MDP family 40 with a near-optimal RL solution 49.
Figure 4:
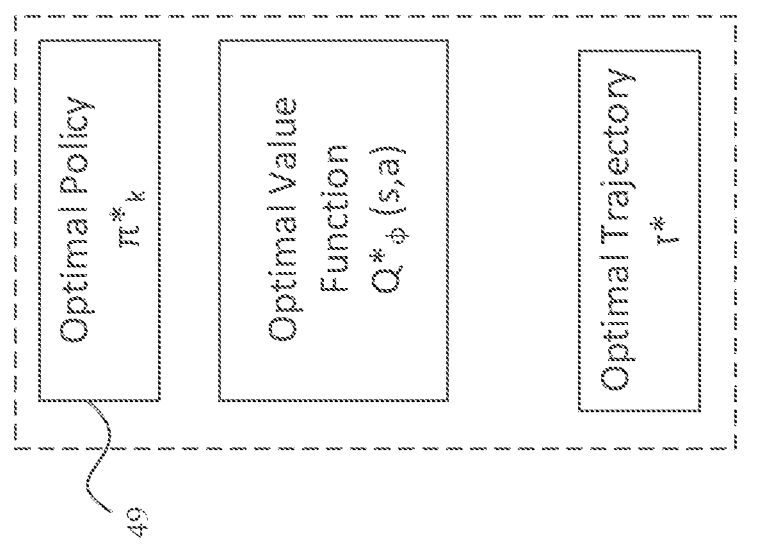

FIG. 4 compares a parameterized MDP family 40 with a near-optimal RL solution 49.

At the factory, the hypernetwork 10 is trained over the family $M_{family}$. Each member of the family, $M_i$, is associated with a Reward function $R_\psi$ with parameters $\psi$ and a Dynamics function $T_\mu$ with parameters $\mu$. The parameterized family $M_{family}$ is indicated on the left hand portion of FIG. 4. A member of $M_{family}$ may be generated by a Monte Carlo simulation of random variables $\psi$ for the reward function and random variables $\mu$ for the dynamics function configured with statistical moments such as means and variances of the random variables.

The RL algorithm can be used on a member of the family to find the near-optimal policy and near-optimal value function as shown in Equation 1.

$$M_i \rightarrow \pi_i^*(a \mid s), Q_i^*(s, a) \quad \text{Equation 1}$$

Assuming that MDP $M_i$ can be characterized by its parameters $\psi_i$ and $\mu_i$, Equation 1 can be simplified as Equation 2.

$$M(\psi_i, \mu_i) \rightarrow \pi^*(a \mid s, \psi_i, \mu_i), Q^*(s, a \mid \psi_i, \mu_i) \quad \text{Equation 2}$$

The near-optimal policy can be rolled out in an environment to obtain near-optimal trajectories as shown in Equation 3.

$$\pi^* \rightarrow \tau^*(\psi, \mu) \quad \text{Equation 3}$$

Two tasks are related if their reward parameters $\psi$ exhibit cross-correlation above a first predetermined cross-correlation threshold and if their dynamic function parameters exhibit a cross-correlation above a second predetermined cross-correlation threshold.

The near-optimal reinforcement learning solution for any task is listed on the right hand side of FIG. 4 and indicated with reference number 49.

Figure 8:
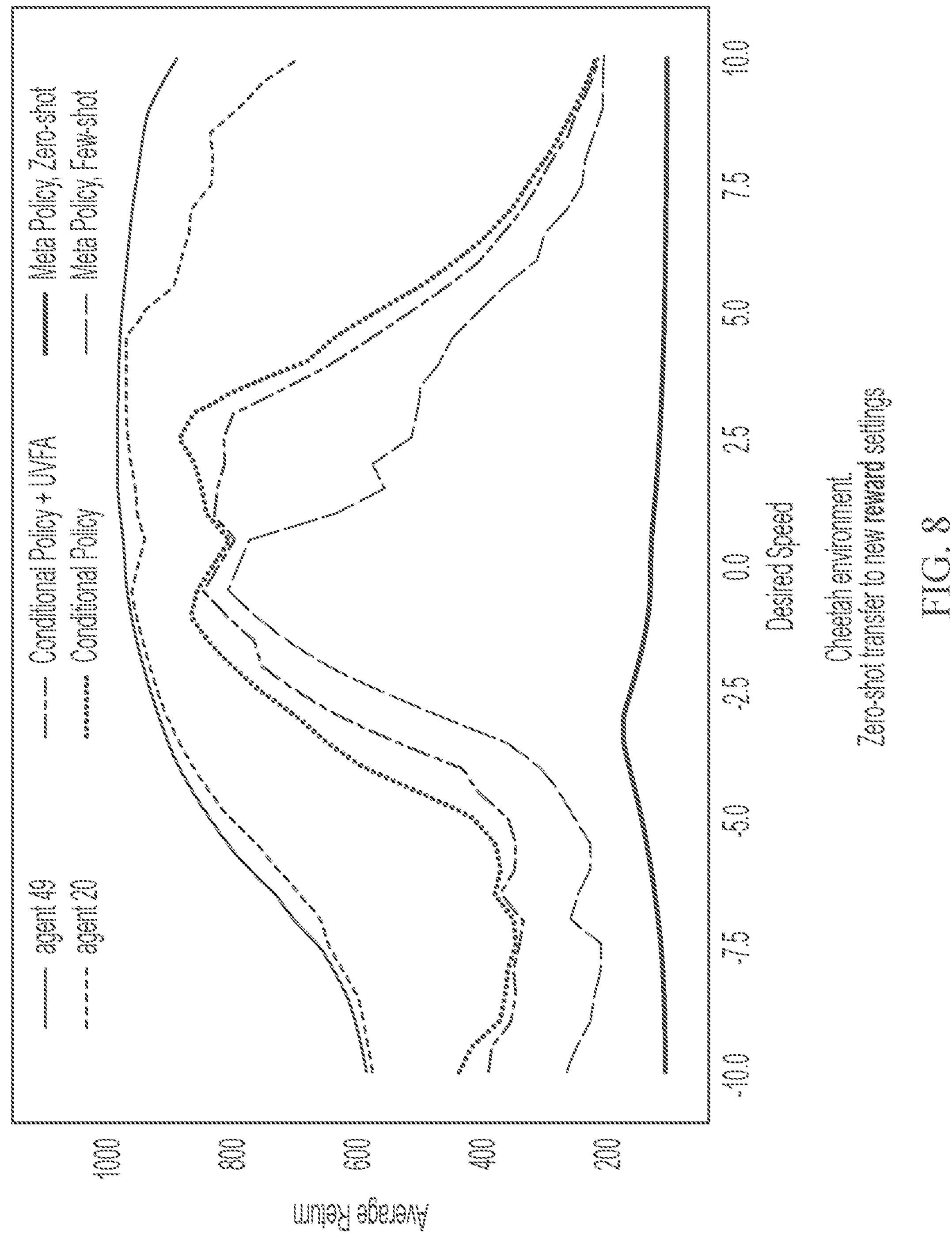
FIG. 8 illustrates exemplary performance of an agent 20 obtained using the hypernetwork 10 for new reward settings (speed of a Cheetah model) in comparison to a near-optimal agent 49 and compared to other approaches.
Figure 9:
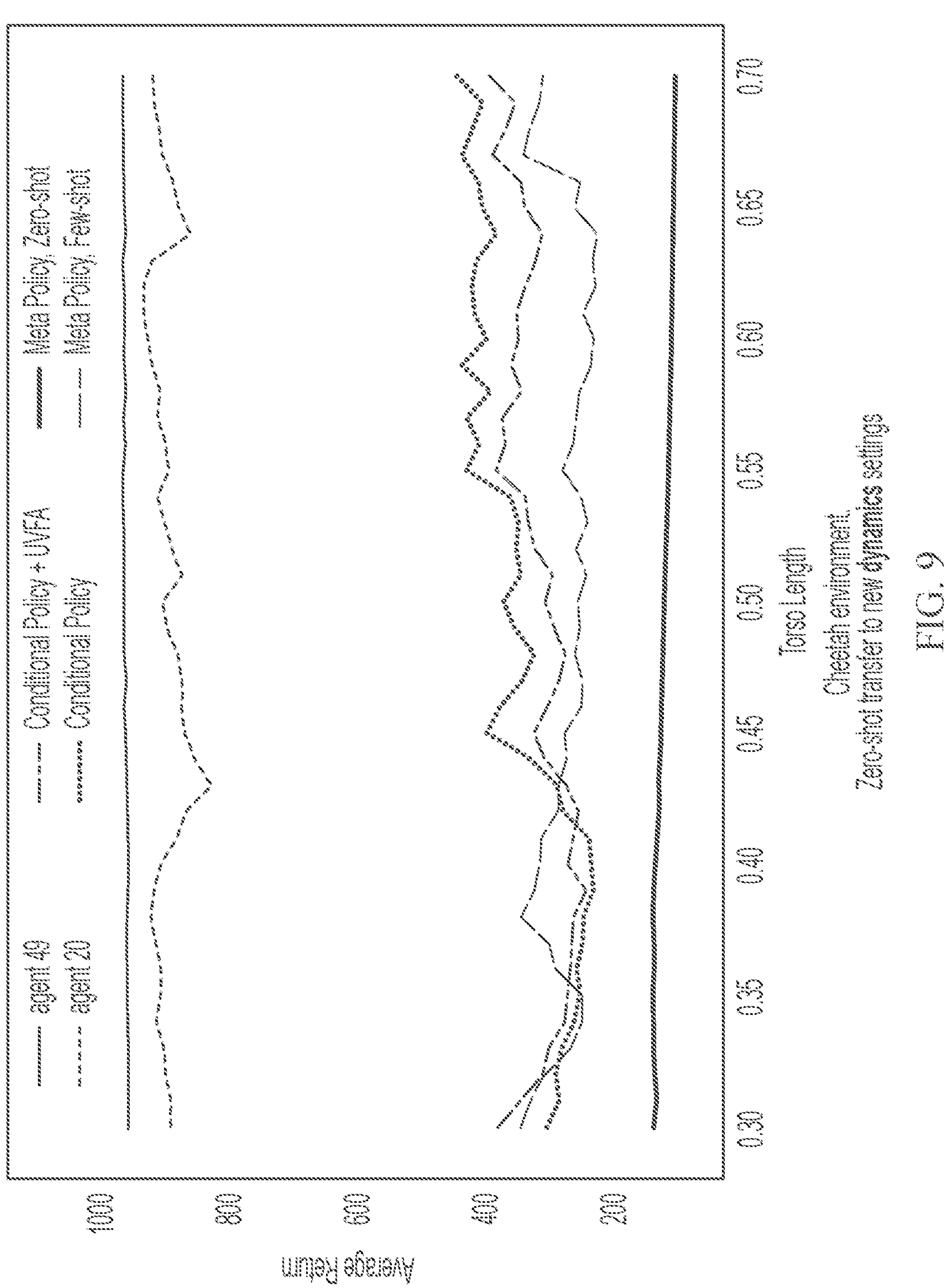
FIG. 9 illustrates exemplary performance of an agent 20 obtained using the hypernetwork 10 for new dynamic settings (torso length of the Cheetah model) in comparison to a near-optimal agent 49 and compared to other approaches.

Using the hypernetwork 10, performance similar to that of the RL solution 49 is obtained, see FIGS. 8-9, but without attempting to exhaustively store all such solutions.

Figure 5:
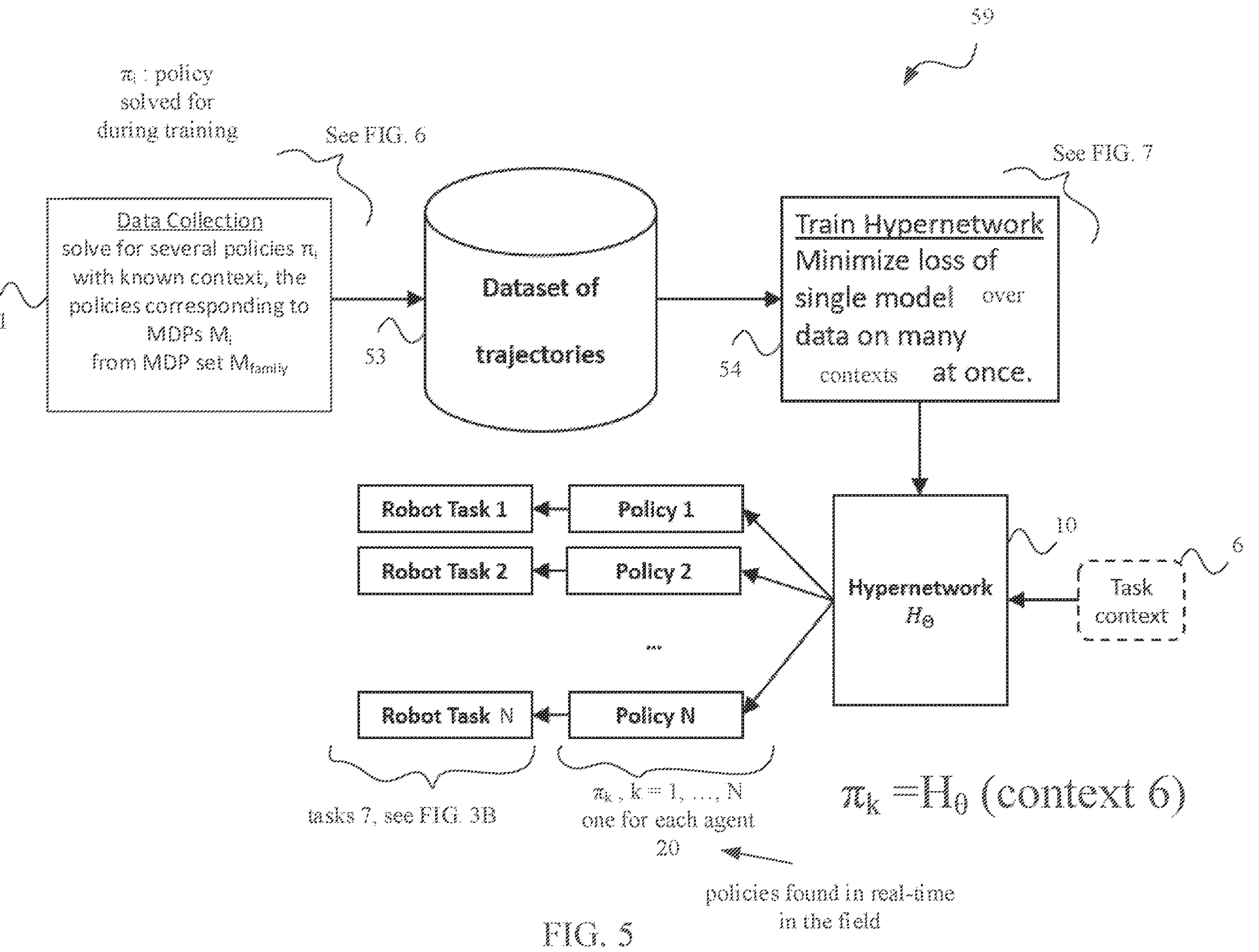
FIG. 5 illustrates steps in obtaining the hypernetwork 10 and then generating artificial intelligence machines represented by policies for performing new tasks, according to an example embodiment.

FIG. 5 illustrates steps 59 in obtaining the hypernetwork 10 and then generating artificial intelligence machines represented by policies $\pi_k$ for performing new tasks.

On the left hand portion of FIG. 5, several related tasks are solved using reinforcement learning with known context. These several related tasks may be, for example, $M_{family}$ discussed above.

Step 51 indicates obtaining trajectories. Further details of obtaining the trajectories are given in FIG. 6. After obtaining a sufficient number of trajectories for $M_{family}$ using reinforcement learning, the dataset of trajectories 53 is complete. Then the step 54 of training the hypernetwork 10 occurs. Further discussion of training the hypernetwork 10 is given in FIG. 7.

After step 54, the robot 30 is deployed from the robot factory.

In use, a task 6 is given to the (trained) hypernetwork 10 to obtain a new policy. For new tasks indexed by 1, . . . , N, new policies $\pi_k$ for k=1, . . . , N are obtained, each of these corresponds to a related, but different robot task.

Figure 6:
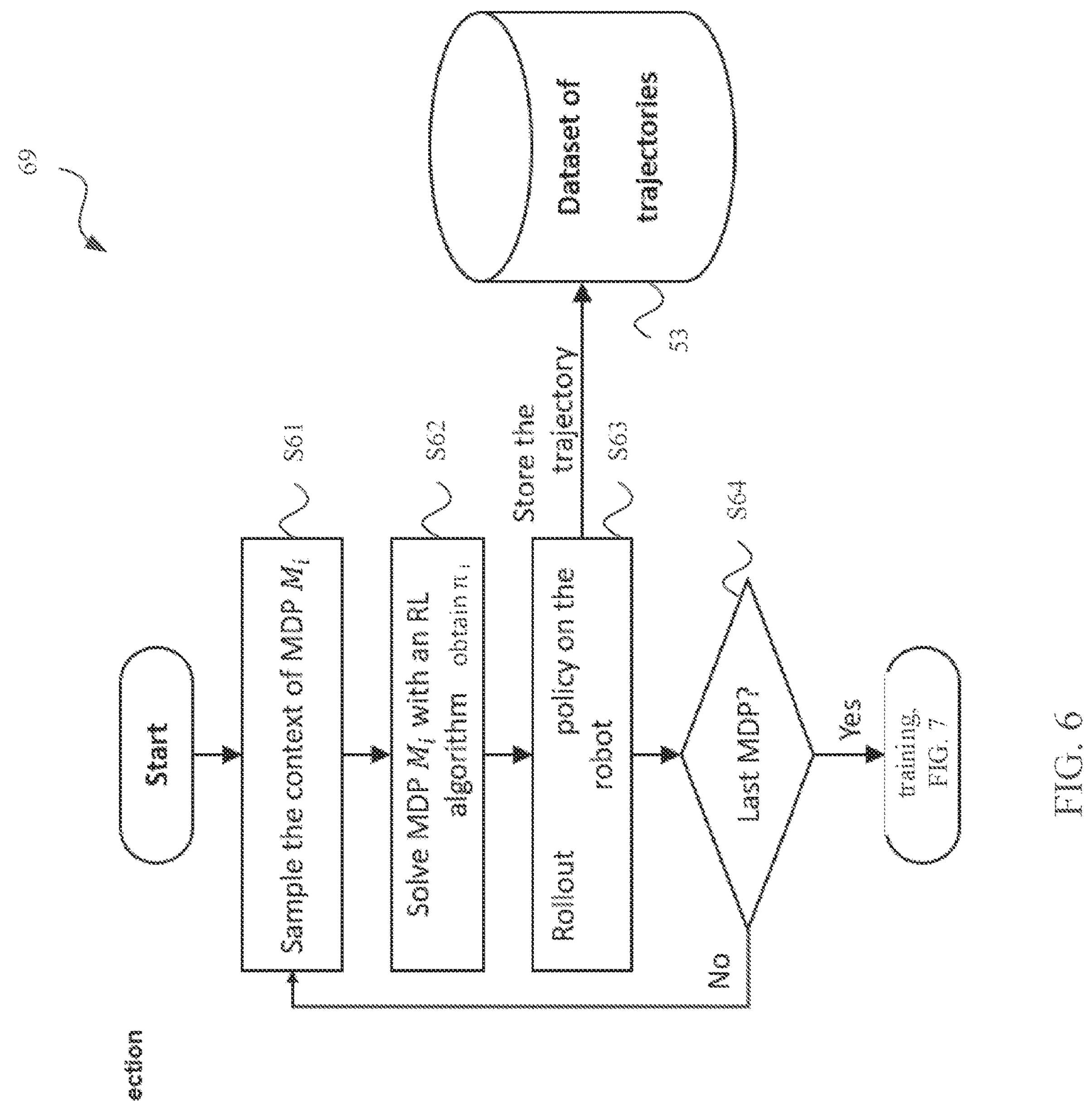
FIG. 6 illustrates a logic flow for collecting data to be used for training the hypernetwork 10, according to an example embodiment.

FIG. 6 illustrates logic 69 for collecting data to be used for training the hypernetwork 10. At operation S61, an MDP $M_i$ is sampled from $M_{family}$. This sampling provides $R_i$ and $T_i$. Using reinforcement learning, the optimal policy $\pi_i$ and optimal value function $Q_i$ can now be found at operation S62. At operation S63, the optimal policy and value function are rolled out to a test robot in the robot factory. The test robot attempts the task for this policy. A corresponding trajectory is found and stored in the dataset 53. At operation S64, it is determined whether enough trajectories have been obtained in order for Q and V to stabilize.

Pseudocode for building up the dataset 53 is provided in Table 1.

TABLE 1

| | |
|---|---|
| | Inputs: reward function $R_\psi$, transition dynamics $T_\mu$, probability distributions over parameters $p(\psi)$ and $p(\mu)$. Outputs: hypernetwork $H_\Theta$, main networks $\pi_\theta$ , $Q_\phi$. Hyperparameters: RL algorithm, learning rate $\alpha$ of hypernetwork, number of tasks N. |
| 1 | Initialize dataset 53, also referred to as D |
| 2 | For I = 1 to N do |
| 3 | Sample MDP $M_i$, $\psi_i \sim p(\psi)$, $\mu_i \sim p(\mu_i)$ |
| 4 | Obtain $\pi_i$and $Q_i$ of $M_i$ with an RL solver |
| 5 | Store near-optimal trajectories $\tau_i$ in D |
| 6 | End for |
| 7 | While not done do |
| 8 | Sample mini-batch $< \psi_i, \mu_i, s, a^*, s', r, q^* >\sim D$ |
| 9 | Generate $\pi_i$ and $Q_i$: $[\theta_i; \phi_i] = H_\Theta(\psi_i, \mu_i)$ |
| 10 | $\Theta \leftarrow \text{argmin}[L_{pred} + L_{TD}]$ |
| 11 | End while |

Figure 7:
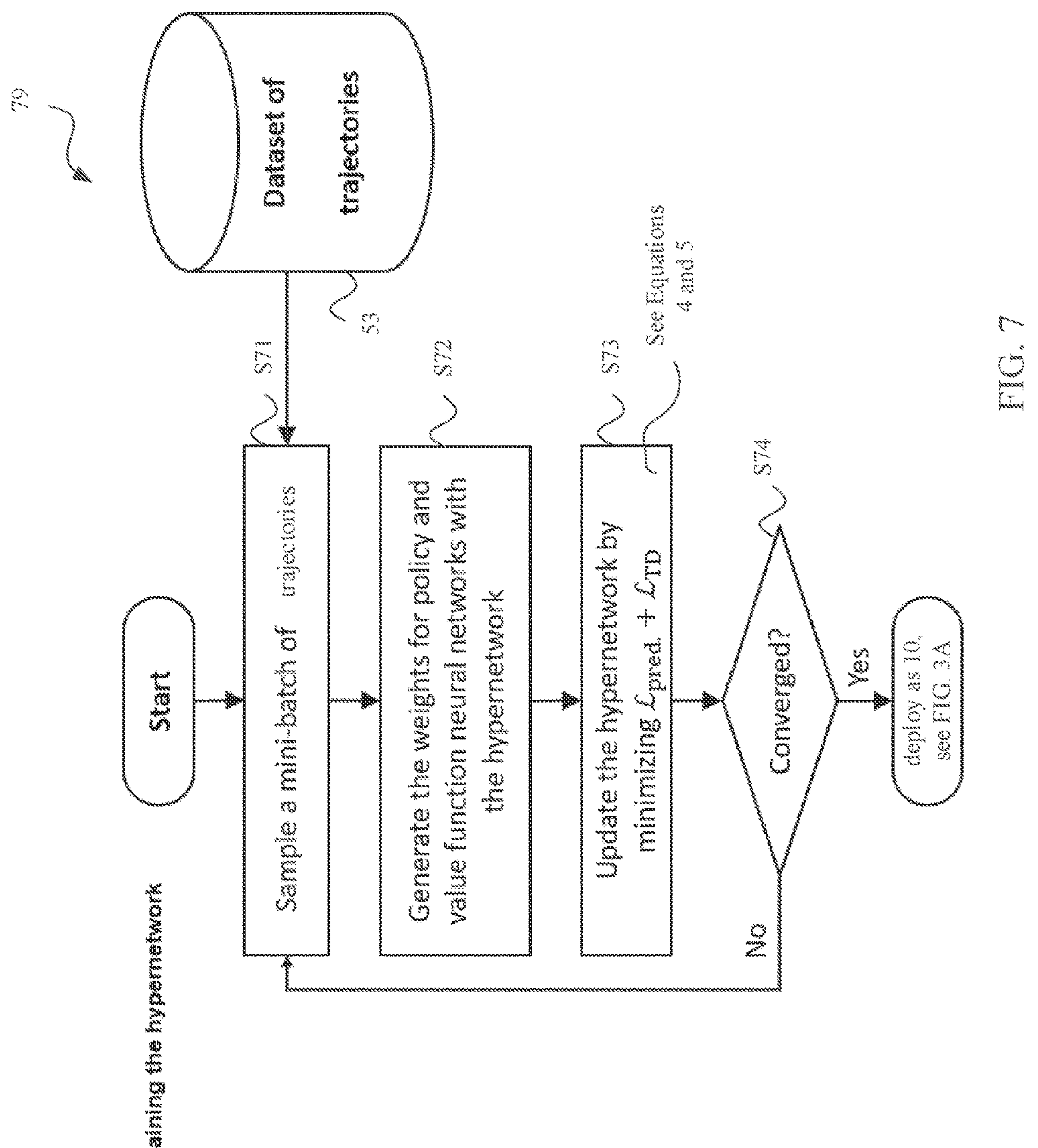
FIG. 7 illustrates a logic flow for training the hypernetwork 10, according to an example embodiment.

If enough trajectories have been obtained, the logic flows to logic 79 of FIG. 7 and the hypernetwork is trained at the robot factory.

Referring generally to FIG. 6, the dataset 53 of trajectories may be built up using software modeling. Some embodiments include initializing the plurality of system parameter sets to be empty; using a software model to define a set of state, action, reward n-tuples; and solving, using an RL solver applied to the set of n-tuples, for the policy ($\pi_i$) and the value function (Q), wherein the policy ($\pi_i$) and the value function (Q) form a first set of data, the first set of data comprises an indication of a first context, and the first set of data includes a first plurality of system parameters ($\psi_i$,$\mu_i$,s, a*,s',r,q*); and augmenting the plurality of system parameter sets with the first set of data.

Some embodiments build up the dataset 53 using observed ideal actions, for example, successful robot arm articulations for picking up a coffee cup without crushing the cup and without spilling the coffee. Some embodiments include receiving a plurality of first trajectories; and solving for a plurality of first reward parameters ($\psi$) and a plurality of first transition dynamics parameters ($\mu$) based on the plurality of first trajectories.

During training some embodiments perform learning to obtain the hypernetwork 10 ($H_\theta$) by generating, using the hypernetwork, the policy weights for a policy ($\pi_i$) by solving for a plurality of first policy parameters ($\theta$) based on the plurality of first reward parameters ($\psi$) and the plurality of first transition dynamics parameters ($\mu$) and based on a plurality of second reward parameters ($\psi$) and a plurality of second transition dynamics parameters ($\mu$), and generating, using the hypernetwork, the value weights for a value function comprises solving for a plurality of first value parameters ($\phi$) based on the plurality of first reward parameters ($\psi$) and the plurality of first transition dynamics parameters ($\mu$) and based on the plurality of second reward parameters ($\psi$) and the plurality of second transition dynamics parameters ($\mu$).

FIG. 7 illustrates a logic flow 79 for training the hypernetwork 10. At operation S71, a mini-batch of trajectories is sampled from the dataset of trajectories 53. A mini-batch may be a fixed number of training examples that is less than the entire dataset. In each iteration of the loop S71 through S74, the hypernetwork 10 is trained on a different group of samples.

At operation S72, weights 8 for the policy for the value function produced by the hypernetwork 10 are obtained.

At operation S73, based on the policy and value function, the hypernetwork is updated using L_pred+L_TD (see equations 4 and 5 below).

At operation S74 a convergence test for the hypernetwork 10 is applied. The convergence may be tested by recognizing that the weights no longer change significantly after each mini-batch, or an error from a ground truth value is below predetermined maximum allowable error.

The loss L_pred is given by Equation 4 and the loss L_TD is given by Equation 5.

$$L_{pred} = E\left[\hat{Q}_{\psi_i}(s', \overline{a}') - q^*)^2\right] + E[\pi_i^* - a^*)^2 \qquad \text{Equation 4}$$

$$L_{TD} = E\left[(r + \gamma Q_i^*(s', \overline{a}') - q^*)^2\right] \qquad \text{Equation 5}$$

In Equation 5, $\overline{a'}$ is obtained from the approximated deterministic policy $\pi^*(s')$ with stopped gradients.

When the hypernetwork 10 has converged, it may be installed in the robot 30 and the robot 30 shipped from the robot factory. If the hypernetwork 10 has not converged, another mini-batch of trajectories is sampled.

Referring generally to FIG. 7, embodiments perform initializing the hypernetwork 10 ($H_\theta$), sampling a mini-batch of system parameter sets (one system parameter set=$\psi_i$,$\mu_i$, s,a*,s',r,q*) from a plurality of system parameter sets; generating, using the hypernetwork, policy weights for a policy ($\pi_i$); generating, using the hypernetwork, value function weights ($\phi$) for a value function (Q); calculating a first loss, L_pred, using the mini-batch; calculating a second loss, L_TD, using the mini-batch; updating the hypernetwork using the first loss and the second loss; and repeating the sampling through the updating until the hypernetwork has converged.

In some embodiments, L_pred is based on predicting a near-optimal action and based on predicting a near-optimal value, and L_TD is based on moving the predicted target value toward a current value estimate.

Referring to operation S73 of FIG. 7, in some embodiments, L_pred includes an expectation of a first mean square loss and a second mean square loss, wherein the first mean square is based on a first difference between an experienced value and a ground truth value ($\hat{Q}^*-q^*$) and the second mean square loss is based on a second difference between a chosen action and a ground truth action ($\widehat{\pi^*}$ -a*).

Also referring to operation S73 in FIG. 7, in some embodiments, L_TD includes an expectation of a third mean square loss, wherein the third mean square loss is based on an obtained reward (r) for moving to a next state (s') summed with a difference of a second experienced value ($\hat{Q}_{\psi_i}(s',\overline{a'})$) with a ground truth value (q*).

Embodiments improve the performance of models rolled out to perform new robot tasks.

FIG. 8 illustrates exemplary performance of an agent 20 obtained using the hypernetwork 10 for new reward settings in comparison to a near-optimal agent 49 and compared to other approaches.

For example, the rewards setting may be changed such as a different speed for a Cheetah environment. FIG. 8 illustrates average performance of the agent 20 as being close to the near-ideal performance of agent 49. Baseline methods do not perform as well as agent 20. The base line methods are a conditional policy, conditional policy+UVFA, a meta policy at zero shot, and a meta policy at few shot.

The meta policy is a context-conditioned meta policy; trained to predict actions and evaluated for both zero-shot and few-shot transfer. The context-conditioned meta-policy substitutes the inferred task by the ground-truth task.

A conditional policy is a context-conditioned policy. It is trained to predict actions, similarly to imitation learning methods. The baseline of conditional policy+UVFA uses the TD loss term also.

FIG. 9 illustrates exemplary performance of an agent 20 obtained using the hypernetwork 10 for new dynamic settings (torso length of the Cheetah model) in comparison to a near-optimal agent 49 and compared to other approaches.

Figure 10:
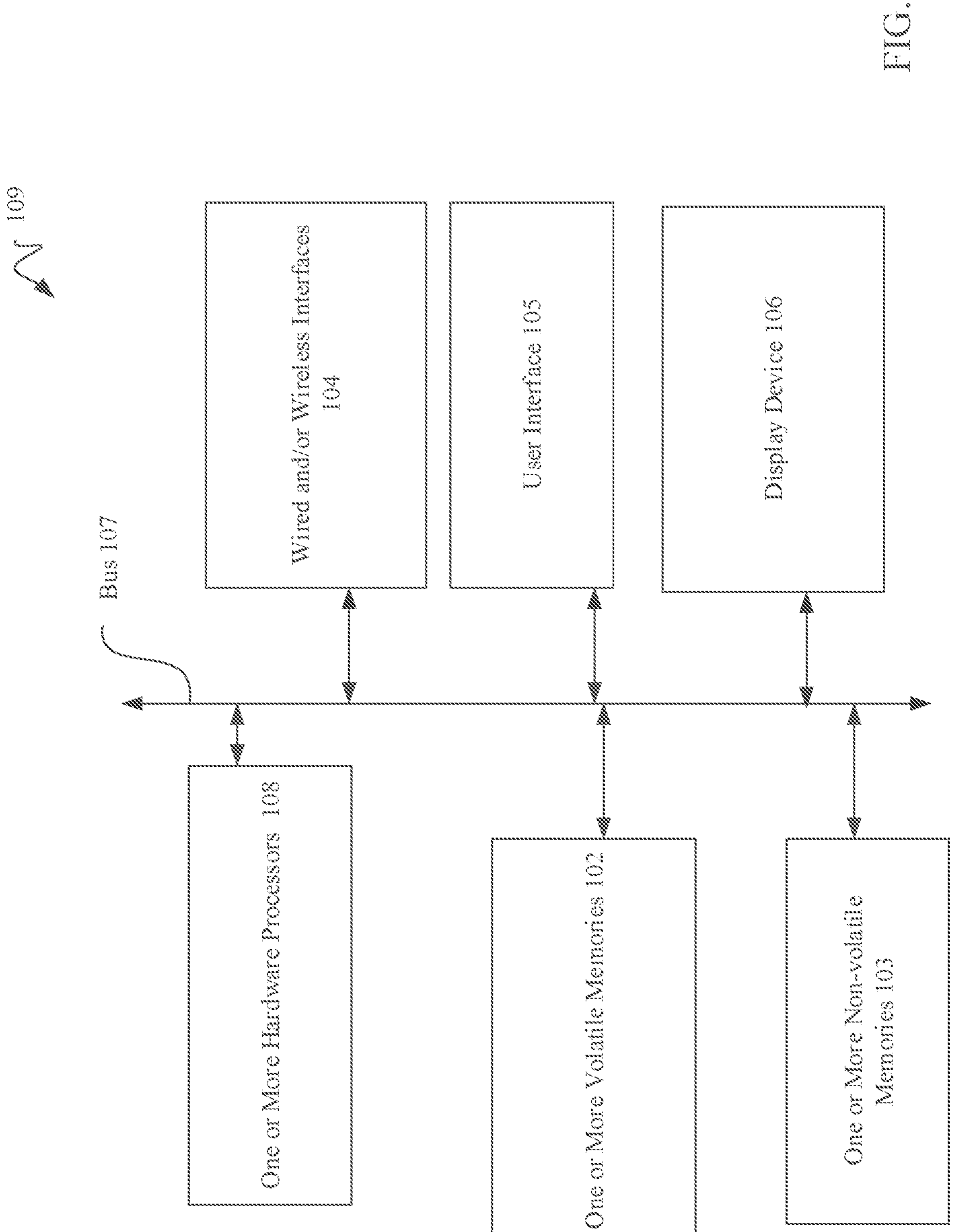
FIG. 10 illustrates exemplary hardware for implementation of computing devices for implementing the systems and algorithms described by the figures, according to some embodiments.

Hardware for performing embodiments provided herein is now described with respect to FIG. 10. FIG. 10 illustrates an exemplary apparatus 109 for implementation of the embodiments disclosed herein. The apparatus 109 may be a server, a computer, a laptop computer, a handheld device, or a tablet computer device, for example. Apparatus 109 may include one or more hardware processors 108. The one or more hardware processors 108 may include an ASIC (application specific integrated circuit), CPU (for example CISC or RISC device), and/or custom hardware. Embodiments can be deployed on various GPUs. Also, embodiments may be deployed on various computers, servers or workstations. Apparatus 109 also may include a user interface 105 (for example a display screen and/or keyboard and/or pointing device such as a mouse). Apparatus 109 may include one or more volatile memories 102 and one or more non-volatile memories 103. The one or more non-volatile memories 103 may include a non-transitory computer readable medium storing instructions for execution by the one or more hardware processors 108 to cause apparatus 109 to perform any of the methods of embodiments disclosed herein.

What is claimed is:

1. A method of training a hypernetwork, the method comprising:

initializing the hypernetwork;

sampling a mini-batch of system parameter sets from a plurality of system parameter sets;

generating, using the hypernetwork, policy weights for a policy;

generating, using the hypernetwork, value function weights for a value function;

calculating a first loss, L_pred, using the mini-batch;

calculating a second loss, L_TD, using the mini-batch;

updating the hypernetwork using the first loss and the second loss; and repeating the sampling through the updating until the hypernetwork has converged.

2. The method of claim 1, wherein L_pred is based on predicting a near-optimal action and based on predicting a near-optimal value, and wherein L_TD is based on moving the predicted near-optimal value toward a current value estimate.

3. The method of claim 1, further comprising:

initializing the plurality of system parameter sets to be empty;

using a software model to define a set n-tuples, each n-tuple of the set of n-tuples comprising values of state, action, and reward; and solving, using an RL solver applied to the set of n-tuples, for the policy and the value function, wherein the policy and the value function form a first set of data, wherein the first set of data comprises an indication of a first context, and the first set of data further comprises a first plurality of system parameters; and augmenting the plurality of system parameter sets with the first set of data.

4. The method of claim 1, further comprising:

receiving a plurality of first trajectories; and solving for a plurality of first reward parameters and a plurality of first transition dynamics parameters based on the plurality of first trajectories.

5. The method of claim 4, wherein the generating, using the hypernetwork, the policy weights for the policy comprises solving for a plurality of first policy parameters based on the plurality of first reward parameters and the plurality of first transition dynamics parameters and based on a plurality of second reward parameters and a plurality of second transition dynamics parameters, and wherein the generating, using the hypernetwork, the value function weights for the value function comprises solving for a plurality of first value parameters based on the plurality of first reward parameters and the plurality of first transition dynamics parameters and based on the plurality of second reward parameters and the plurality of second transition dynamics parameters.

6. The method of claim 1, wherein L_pred comprises an expectation of a first mean square loss and a second mean square loss, wherein the first mean square loss is based on a first difference between an experienced value and a ground truth value and the second mean square loss is based on a second difference between a chosen action and a ground truth action.

7. The method of claim 1, where L_TD comprises an expectation of a third mean square loss, wherein the third mean square loss is based on an obtained reward for moving to a next state summed with a difference of a second experienced value with a ground truth value.

8. The method of claim 5, further comprising:

receiving a voice command from a user;

mapping the voice command to a context;

mapping the context to a hypernetwork input;

obtaining the policy by inputting the hypernetwork input to the hypernetwork; and manipulating, using and in response to the voice command, an object with a robot arm.

9. An apparatus comprising:

one or more processors; and one or more memories, the one or more memories storing instructions configured to cause the apparatus to at least:

initialize a hypernetwork;

sample a mini-batch of system parameter sets from a plurality of system parameter sets;

generate, using the hypernetwork, policy weights for a policy;

generate, using the hypernetwork, value function weights for a value function;

calculate a first loss, L_pred, using the mini-batch;

calculate a second loss, L_TD, using the mini-batch;

update the hypernetwork using the first loss and the second loss; and repeatedly perform the sample through update operations until the hypernetwork has converged.

10. The apparatus of claim 9, wherein L_pred is based on predicting a near-optimal action and based on predicting a near-optimal value, and wherein L_TD is based on moving the predicted near-optimal value toward a current value estimate.

11. The apparatus of claim 9, wherein the instructions are further configured to cause the apparatus to at least:

initialize the plurality of system parameter sets to be empty;

use a software model to define a set n-tuples, each n-tuple of the set of n-tuples comprising values of state, action, and reward; and solve, using an RL solver applied to the set of n-tuples, for the policy and the value function, wherein the policy and the value function form a first set of data, wherein the first set of data comprises an indication of a first context, and the first set of data further comprises a first plurality of system parameters; and augment the plurality of system parameter sets with the first set of data.

12. The apparatus of claim 9, wherein the instructions are further configured to cause the apparatus to at least:

receive a plurality of first trajectories; and solve for a plurality of first reward parameters and a plurality of first transition dynamics parameters based on the plurality of first trajectories.

13. The apparatus of claim 12, wherein the instructions are further configured to cause the apparatus to:

solve for a plurality of first policy parameters based on the plurality of first reward parameters and the plurality of first transition dynamics parameters and based on a plurality of second reward parameters and a plurality of second transition dynamics parameters, and solve for a plurality of first value parameters based on the plurality of first reward parameters and the plurality of first transition dynamics parameters and based on the plurality of second reward parameters and the plurality of second transition dynamics parameters.

14. The apparatus of claim 9, wherein L_pred comprises an expectation of a first mean square loss and a second mean square loss, wherein the first mean square loss is based on a first difference between an experienced value and a ground truth value and the second mean square loss is based on a second difference between a chosen action and a ground truth action.

15. The apparatus of claim 9, wherein L_TD comprises an expectation of a third mean square loss, wherein the third mean square loss is based on an obtained reward for moving to a next state summed with a difference of a second experienced value with a ground truth value.

16. The apparatus of claim 13, wherein the instructions are further configured to cause the apparatus to at least:

receive a voice command from a user;

map the voice command to a context;

map the context to a hypernetwork input;

obtain the policy by inputting the hypernetwork input to the hypernetwork; and manipulate, using the policy and in response to the voice command, an object with a robot arm.

17. A non-transitory computer readable medium storing instructions, the instructions configured to cause an apparatus to at least:

initialize a hypernetwork;

sample a mini-batch of system parameter sets from a plurality of system parameter sets;

generate, using the hypernetwork, policy weights for a policy;

generate, using the hypernetwork, value function weights for a value function;

calculate a first loss, L_pred, using the mini-batch;

calculate a second loss, L_TD, using the mini-batch;

update the hypernetwork using the first loss and the second loss; and repeatedly perform the sample through update operations until the hypernetwork has converged.

18. The non-transitory computer readable medium of claim 17, wherein L_pred is based on predicting a near-optimal action and based on predicting a near-optimal value, and wherein L_TD is based on moving the predicted near-optimal value toward a current value estimate.

19. The non-transitory computer readable medium of claim 17, wherein the instructions are further configured to cause the apparatus to at least:

initialize the plurality of system parameter sets to be empty;

use a software model to define a set n-tuples, each n-tuple of the set of n-tuples comprising values of state, action, and reward; and solve, using an RL solver applied to the set of n-tuples, for the policy and the value function, wherein the policy and the value function form a first set of data, wherein the first set of data comprises an indication of a first context, and the first set of data further comprises a first plurality of system parameters; and augment the plurality of system parameter sets with the first set of data.

20. The non-transitory computer readable medium of claim 17, wherein the instructions are further configured to cause the apparatus to at least:

receive a voice command from a user;

map the voice command to a context;

map the context to a hypernetwork input;

obtain the policy by inputting the hypernetwork input to the hypernetwork; and manipulate, using the policy and in response to the voice command, an object with a robot arm.

* * * * *